UNITED STATES PATENT OFFICE.

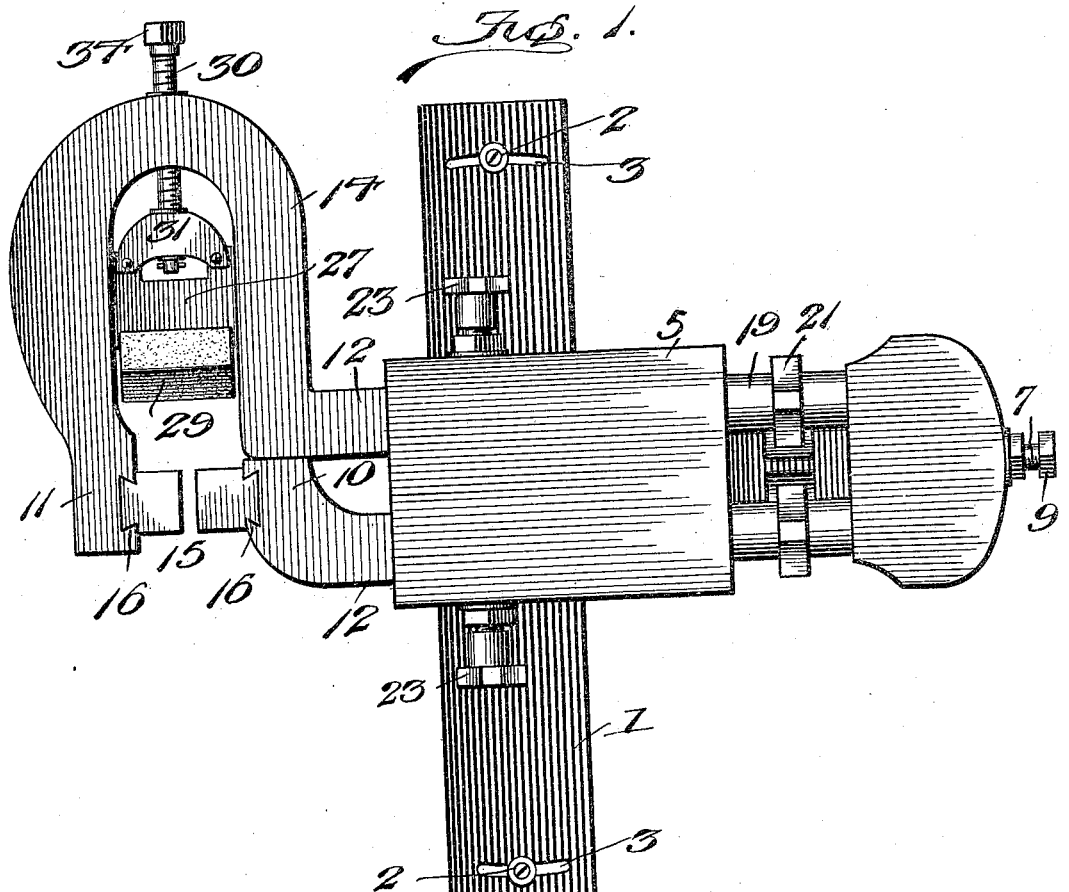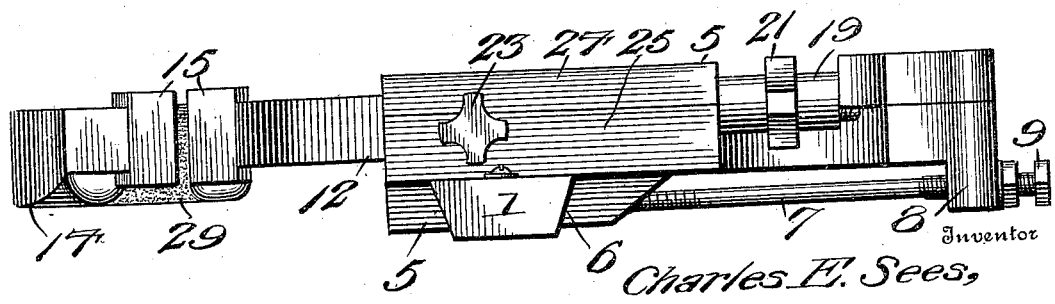

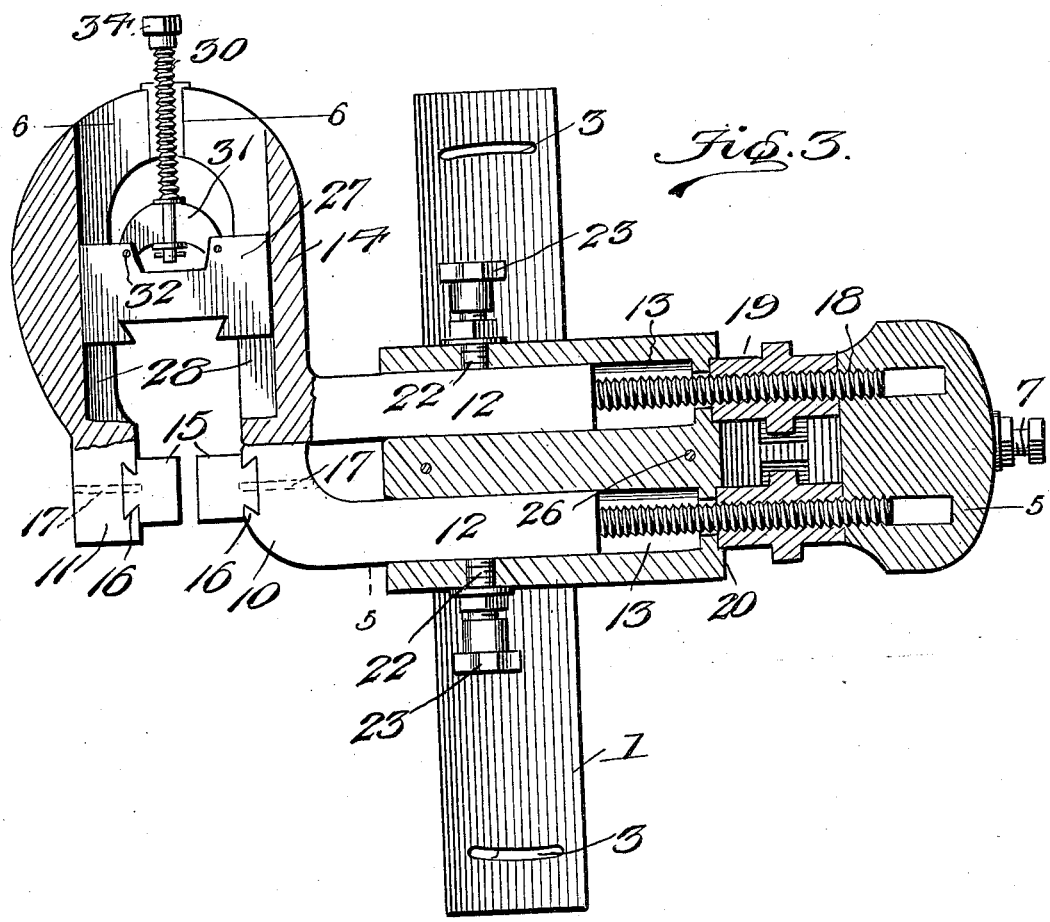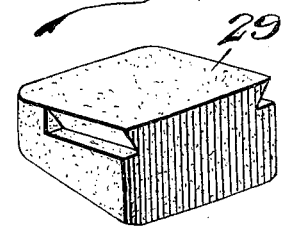

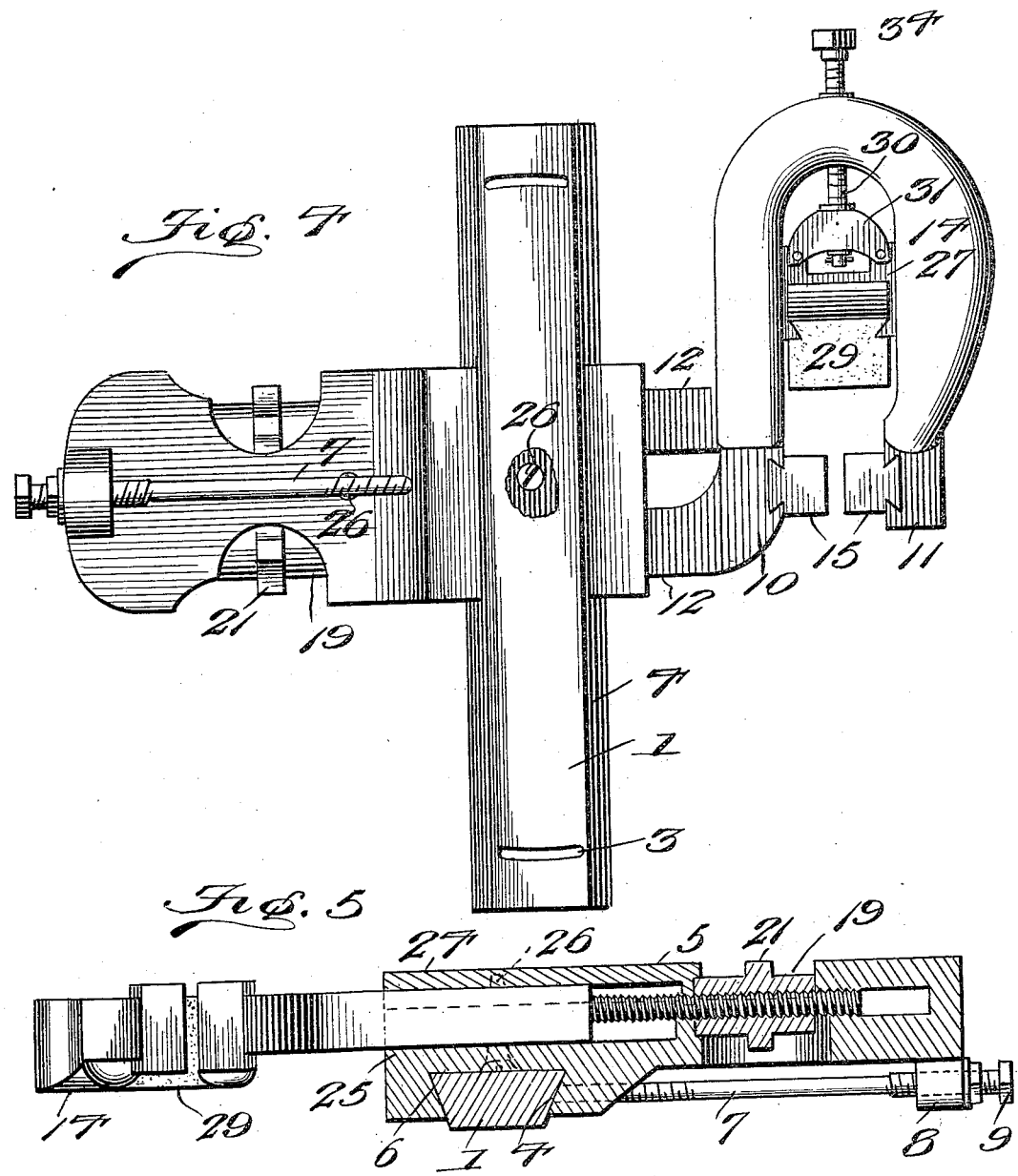

CHARLES E. SEES, OF DANVILLE, PENNSYLVANIA.

SAW-GUIDE.

944,217.

Specification of Letters Patent. Patented Dec. 21, 1909.

Application filed May 16, 1907. Serial No. 374,021.

*To all whom it may concern:*

Be it known that I, CHARLES E. SEES, a citizen of the United States, residing at Danville, in the county of Montour and State of Pennsylvania, have invented new and useful Improvements in Saw-Guides, of which the following is a specification.

This invention relates to a combined guide and rounding device for circular saws of that type provided with adjustable guide jaws with which is associated the rounding means for dressing the teeth of the saw to preserve the proper curvature.

The invention has for one of its objects to improve and simplify the construction and operation of apparatus of this character so as to be comparatively easy and inexpensive to manufacture, composed of few parts, and susceptible to a large variety of adjustments.

A further object of the invention is the provision of a saw guide having independently adjustable jaws mounted upon a slidable carriage or block.

Another object of the invention is to produce a device of the character referred to in which the jaw-carrying slide or carriage is mounted on a base plate which is adjustable on the saw frame so as to throw the jaws into different angular positions to accommodate them to the saw.

With these objects in view and others, as will appear as the description proceeds, the invention comprises the novel features of construction and arrangement of parts which will be more fully described hereinafter and set forth with particularity in the claims appended hereto.

In the accompanying drawings, which illustrate one of the embodiments of the invention, Figure 1 is a front view of the device. Fig. 2 is a bottom plan view thereof. Fig. 3 is a vertical longitudinal section of the jaw slide or carriage, with one of the jaws in section. Fig. 4 is a rear elevation of the device. Fig. 5 is a horizontal section on line 5—5, Fig. 3. Fig. 6 is a horizontal section on line 6—6, Fig. 3. Fig. 7 is a perspective view of the emery block of the rounder.

Similar reference characters are employed to designate corresponding parts throughout the several views.

Referring to the drawings, 1 designates the base-plate of the device which is adapted to be secured to the frame of the saw by means of clamping screws 2 passing through arcuate slots 3 struck from the center of the base-plate as clearly shown in Fig. 1, whereby the base-plate and hence the jaws of the device can be set to any desired angle to accommodate the device to different kinds of saws. The sides of the base-plate are beveled at 4 so as to be of dove-tail cross-section, as clearly shown in Figs. 2 and 5. Movable longitudinally of the base plate is a carriage or slide block 5 having a dove-tail groove 6 for engaging the beveled sides of the base-plate, whereby the two are locked together. The slide or carriage 5 is clamped in adjusted position by a screw 7 mounted in a rearwardly extending lug 8 and extending into the groove 6 through the slide 5 to bind at its inner end on the base-plate, as clearly shown in Figs. 2 and 5, the outer end of the screw having the head 9, whereby it can be tightened or loosened. Slidably mounted in the carriage or slide 5 are independently adjustable jaws 10 and 11, each having a shank 12 of non-circular cross-section movable back and forth in a guide-way 13. The jaw 11 is connected with its shank by an upwardly-extending yoke 14 so as to receive the peripheral portion of the saw rotating between the two jaws. On the opposed faces of the jaws are contact pieces or wearing blocks 15 that are connected to their respective jaws by dove-tail joints 16, and if desired, they may be further secured by pins 17 or equivalent means, as shown by dotted lines in Fig. 3. Each jaw shank has a screw 18 on which is an adjusting nut 19, the adjusting nuts being confined between parallel walls 20 formed by cutting away a portion of the front side of the carriage 5 at a point intermediate its ends. The adjusting nuts 19 are formed with finger-grips 21 whereby the nuts can be conveniently turned by hand.

To hold the jaws of the device positively in set position, clamping screws 22 are arranged on the top and bottom of the carriage 5 to bind at their inner ends on the shanks 12, the screws having hand-wheels 23, whereby they can be conveniently turned. The slide or carriage 5 is made in two sections 24 and 25, as clearly shown in Fig. 2, that are divisible on a plane parallel with the shanks of the jaws and held in place by screws 26 or equivalent means.

The grounding or grinding device is mounted on the outer jaw 11 and comprises a slide or holder 27 movable vertically in the guideways 28 formed by slotting the opposed surfaces of the yoke 14, as clearly shown in Fig. 3. On the slide or holder 27 is a block of emery 29, or other suitable abrasive means, the block being connected with the holder by a dove-tail joint. The holder 27 is adjustable toward or away from the circular saw by means of a screw 30 that is swiveled at its inner end and detachably connected with a cross-piece 31, which cross-piece is detachably connected with the holder or slide 27 by pins 32. The screw 30 works in a two-part nut 33, Figs. 3 and 6, and on the upper end of the screw is a head 34 for receiving a wrench. The yoke 14 is open at its upper end for permitting the slide 27 to be inserted or removed. Normally, the emery block 29 is raised a suitable distance above the saw so as to permit the saw to operate without danger of the sawdust being jammed between the block and saw. When, however, it is desired to grind the saw, the screw 30 is manipulated between the emery block into engagement with the teeth to round the saw.

In practice, the base-plate 1 is first adjusted on the frame of the saw so as to bring the jaws of the device in proper angular relation to the circuit or saw. The nuts 19 are manipulated so as to throw the jaws toward or away from each other to vary the distance between the members 15 that normally engage on opposite sides of the saw. After the jaws are properly adjusted, the clamping screws 22 are tightened.

It will thus be seen that the device may be employed in connection with saws of different thicknesses and by shifting the slide or carriage 5 along the base-plate 1, the device can be accommodated to saws of different diameters. Since the rounding device is permanently carried by one of the jaws, it will always be in ready coöperative relation with the saw, so that it is merely necessary to manipulate the screw 30 whenever it is desired to grind the saw to preserve a true circular periphery.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:—

1. In a saw guide, comprising a yoke having guides extended inward from the ends of its side members, and having longitudinal slots in the inner sides of said members forming guide-ways, and having an opening in the end in communication with said guide-ways, a holder slidable in said guide-ways through the opening formed in said end, a cross piece pinned at its ends to opposite end portions of the holder and insertible through the aforesaid opening in the end of the yoke, and a screw threaded in the end of the yoke, and having a swivel connection at its inner end with said cross piece.

2. In a saw guide, the combination of a spaced parts supporting body, comprising longitudinally-forming abutments having complemental jaws slidably mounted in said body, each having a screw projected from the inner end of its shank and passing through said longitudinally-alined openings formed in said spaced parts of the body and housed thereby, and hand nuts mounted upon the said screws between the said spaced parts of the body and obtaining bearings at their ends against said abutments.

3. A saw guide comprising a base plate, a sectional carriage mounted upon the base plate and adapted to be secured in an adjusted position thereon, said carriage comprising spaced portions forming abutments, having longitudinally-alined openings formed therein, jaws slidably mounted in the carriage, each having a screw extending from the inner end of its shank and passing through the longitudinally-alined openings formed in the spaced portions of the body and housed thereby, one of said jaws being connected with its shank by means of a yoke, an adjustable truing member mounted in said yoke, hand nuts mounted upon said screws and obtaining bearings at their ends against said abutments for adjusting the jaws, and set screws threaded into said carriage for securing the jaws in the required adjusted position.

In testimony whereof, I affix my signature in presence of two witnesses.

CHARLES E. SEES.

Witnesses:
  CHARLES V. AMERMAN,
  THEODORE W. CLAYTON.